(12) United States Patent
Tung et al.

(10) Patent No.: US 8,632,250 B2
(45) Date of Patent: Jan. 21, 2014

(54) HYBRID LUBRICATING MODULE

(75) Inventors: Chao-Nien Tung, Hsinchu (TW);
Han-Ching Liu, Hsinchu (TW);
Lung-Wei Huang, Hsinchu (TW)

(73) Assignee: NEWCERA Technology Co. Ltd.,
Bandar Seri Begawan (BN)

( * ) Notice: Subject to any disclaimer, the term of this patent is extended or adjusted under 35 U.S.C. 154(b) by 94 days.

(21) Appl. No.: 13/248,630

(22) Filed: Sep. 29, 2011

(65) Prior Publication Data

US 2012/0082406 A1    Apr. 5, 2012

(30) Foreign Application Priority Data

Sep. 30, 2010 (TW) ................ 99133431 A

(51) Int. Cl.
*F16C 17/00* (2006.01)
*F16C 33/10* (2006.01)
*F16C 37/00* (2006.01)

(52) U.S. Cl.
USPC ............ 384/289; 384/129; 384/313; 384/322

(58) Field of Classification Search
USPC ......... 384/241, 276, 279, 286–291, 307, 311, 384/313–316, 322, 385, 386, 392, 397, 400
See application file for complete search history.

(56) References Cited

U.S. PATENT DOCUMENTS

| | | | | |
|---|---|---|---|---|
| 314,731 A | * | 3/1885 | Siebert | 384/385 |
| 701,292 A | * | 6/1902 | Canda | 295/17 |
| 706,906 A | * | 8/1902 | Davis, Jr. | 384/289 |
| 783,870 A | * | 2/1905 | Knapp | 384/286 |
| 1,489,466 A | * | 4/1924 | Stern et al. | 277/516 |
| 1,927,534 A | * | 9/1933 | Wooler | 384/474 |
| 3,503,660 A | * | 3/1970 | Mori Hideo | 384/400 |
| 3,917,362 A | | 11/1975 | Stedman | |
| 5,145,266 A | * | 9/1992 | Saneshige et al. | 384/322 |
| 2002/0146183 A1 | * | 10/2002 | Chen | 384/397 |
| 2006/0171618 A1 | | 8/2006 | Shih | |

FOREIGN PATENT DOCUMENTS

GB        1389857 A    4/1975

* cited by examiner

*Primary Examiner* — Phillip A Johnson
(74) *Attorney, Agent, or Firm* — Muncy, Geissler, Olds & Lowe, PLLC

(57) ABSTRACT

A hybrid lubricating module includes a housing and an assembly which consists of at least two elements and has an axial hole run through by a shaft. At least one of the elements has one set of multiple notches on one end surface communicating with an axle hole. The housing has a through axial cavity to encase the assembly. An outer wall surface of the assembly and an inner wall surface of the housing are assembled to each other to form at least one storage chamber to store lubricating media. Multiple notches on at least one adjacent element form at least one set of passages communicating with the axial hole and the at least one storage chamber.

15 Claims, 13 Drawing Sheets

HYBRID LUBRICATING MODULE

TECHNICAL FIELD

The present disclosure relates to a hybrid lubricating module, and particularly to a hybrid lubricating module having at least one storage chamber for storing lubricating media, and generating multi-channel dynamic pressure and recycling the lubricating media to provide continuous and strong support for spinning a shaft.

DESCRIPTION OF RELATED ART

Conventional bearing usually is hard to long-term operation under a variety of severe operating conditions, such as abnormal high- and low-temperatures, heavy loading, high spinning speeds and strong vibration. After a short period of shaft spinning, lubricating media could be gradually exhausted. As a result of deteriorating tribology interface between axial hole and periphery of the spinning shaft, the shaft could be directly contacted with the axial hole to induce high frequency knocks and impacts, resulting in excessive abrasion and heat generation. So that abnormal signs such as electric current increase, noise generation, shaft scraping, enlarging of axial hole could take place and accelerate damage of the bearing. These are the urgent problems of the conventional bearing yet to be overcome.

US2006/01716181A1 proposes a self-lubrication bearing with a hollow assembly coupled on a shaft. The assembly has T-shaped two-stepped cylindrical struts coupled together through a smaller end to form an indented circumference, and a hollow barrel housing coupled on the assembly to form a storage chamber between them to store lubricating oil. A gap is formed on the connection surface of the storage chamber to allow the lubricating oil to seep and flow into the axial hole. However, lubricants of a higher viscosity cannot be used on the aforesaid bearing.

GB1389857A discloses another type of self-lubrication bearing with a hollow cylindrical barrel made from plastics by injection to couple on a shaft. The plastic element has a plurality of protrusive fin-shaped circular rings formed radially and spaced from each other axially, and a hollow barrel housing is provided to couple on the circumference of the plastic element so that adjacent circular rings form a plurality of annular storage chambers to store lubricating media.

The lubricating media seep and flow into the axial hole through a plurality of apertures formed in the storage chambers. But for the bearing made with a stronger structure through metal or ceramic material, other types of fabrication process have to be adopted. The structure is more complex, and the possibility of mass production is lower.

U.S. Pat. No. 3,917,362A discloses a self-lubrication bearing formed by coupling a hollow assembly on a shaft. The assembly has an annular groove formed radially in the center of the circumferential surface. A hollow barrel housing is provided to encase the circumferential surface so that the groove forms an annular storage to store lubricating grease. The groove has a plurality of apertures formed thereon to allow the lubricating grease to seep and flow into the axial hole.

All the aforesaid conventional bearings do not provide dynamic pressure and lubricating media recycling mechanism, also lack adjustability in terms of supply channels of lubricating media, location and capacity of the storage chamber. They also are less flexible in terms of using diversified lubricating media. Their structures are more complex that reduce the possibility of mass production.

The aforesaid lubricating media generally means any material capable of providing lubrication effect between the spinning shaft and the axial hole of the bearing, including but not limited to lower viscosity lubricating oil and higher viscosity lubricant, such as grease and hybrid lubrication agent containing solid lubricating grains.

Accordingly, it is desirable to provide a novel lubricating means which can overcome the described limitations.

SUMMARY OF THE INVENTION

The present invention aims to overcome the aforesaid disadvantages of the conventional techniques by providing a hybrid lubricating module that includes a housing to form a cavity axially run through a hollow tube and an assembly which consists of at least two elements. Each element has two ends formed two connection portions, at least one of the two connection portions being contacted and connected with an adjacent element. Each element has a circumferential outer wall surface with a mounting portion formed thereon to be encased in the cavity of the housing. The mounting portion is extended axially towards at least one of the two connection portions to form at least one waist portion. The element has an axle hole axially run through thereof. The axle holes of two or more elements form an axial hole of the assembly run through by a shaft. At least one element of the assembly has at least one set of multiple notches formed annularly on at least one of the two connection portions to communicate with at least one waist portion and the axle hole. The outer wall surface of the assembly and the inner wall surface of the housing are assembled to each other to form at least one storage chamber to store lubricating media. The notches form at least one set of multiple passages between at least one adjacent element in the assembly to communicate with the storage chamber and axial hole.

The invention provides a novel hybrid lubricating module formed by assembling at least two elements with adjustable loading length, and number and capacity of the storage chamber, and also uniform distribution of the lubricating media.

In one aspect the invention provides a hybrid lubricating module capable of storing a great amount and diversified lubricating media to extend and improve operation limit and lifespan.

In another aspect the invention provides a hybrid lubricating module product platform with a modular design and simplified mass production process to facilitate control and improve quality and reduce costs.

In yet another aspect the invention provides a novel lubrication mechanism that continuously generates dynamic pressure and recycles lubricating media to provide strong support for the spinning shaft.

In still another aspect the invention provides a hybrid lubricating module development platform that provides flexible designs and versatile applications in response to varying tribology conditions of diversified industries.

The present invention aims to overcome the aforesaid disadvantages of the conventional techniques by providing a hybrid lubricating module that includes a housing to form a cavity axially run through a hollow tube and an assembly which consists of at least two elements. Each element has two ends formed two connection portions, at least one of the two connection portions being contacted and connected with an adjacent element. Each element has a circumferential outer wall surface with a mounting portion formed thereon to be encased in the cavity of the housing. The mounting portion is extended axially towards at least one of the two connection portions to form at least one waist portion. The element has an axle hole axially run through thereof. The axle holes of two or more elements form an axial hole of the assembly run through by a shaft. At least one element of the assembly has at least one set of multiple notches formed annularly on at least one of the two connection portions to communicate with at least one waist portion and the axle hole. The outer wall surface of the assembly and the inner wall surface of the housing are assembled to each other to form at least one storage chamber to store lubricating media. The notches form at least one set of multiple passages between at least one adjacent element in the assembly to communicate with the storage chamber and axial hole.

The invention provides a novel hybrid lubricating module formed by assembling at least two elements with adjustable loading length, and number and capacity of the storage chamber, and also uniform distribution of the lubricating media.

In one aspect the invention provides a hybrid lubricating module capable of storing a great amount and diversified lubricating media to extend and improve operation limit and lifespan.

In another aspect the invention provides a hybrid lubricating module product platform with a modular design and simplified mass production process to facilitate control and improve quality and reduce costs.

In yet another aspect the invention provides a novel lubrication mechanism that continuously generates dynamic pressure and recycles lubricating media to provide strong support for the spinning shaft.

In still another aspect the invention provides a hybrid lubricating module development platform that provides flexible designs and versatile applications in response to varying tribology conditions of diversified industries.

The foregoing, as well as additional objects, features and advantages of the invention will be more readily apparent from the following detailed description, which proceeds with reference to the accompanying drawings.

DETAILED DESCRIPTION

Referring to FIGS. 1 through 13 for the details of the hybrid lubricating module of the invention.

Figure 1:
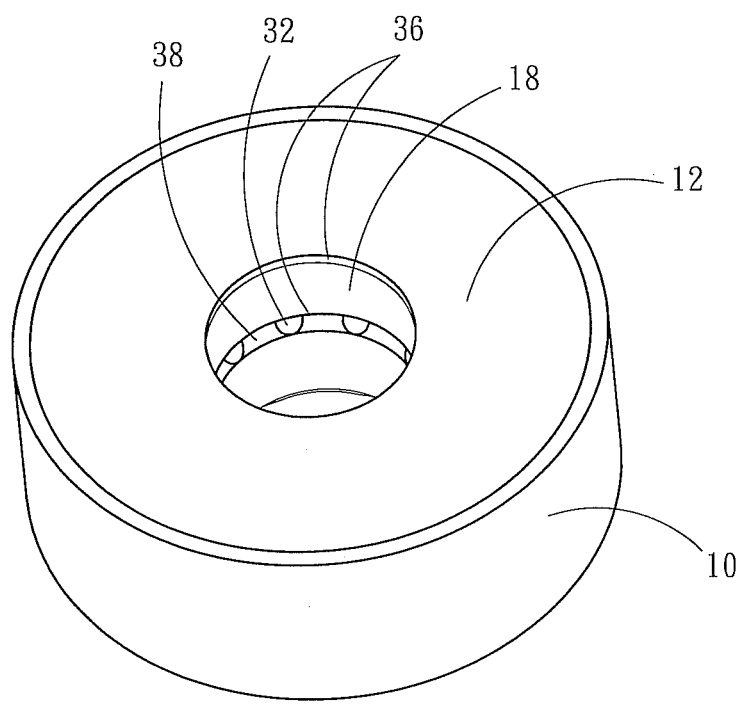
FIG. 1 is a perspective view of a first embodiment of the invention.
Figure 2:
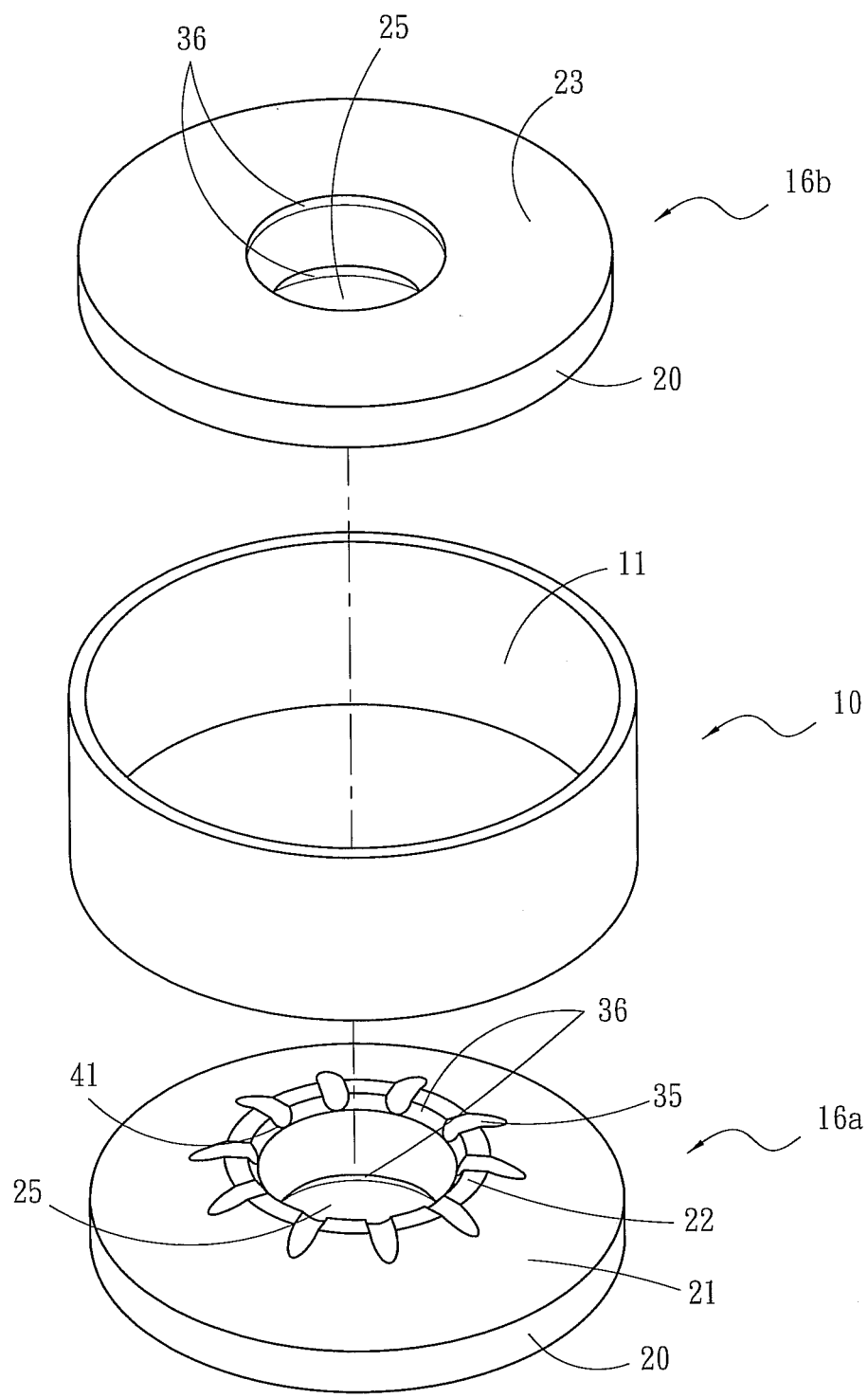
FIG. 2 is an exploded view of the first embodiment of the invention.
Figure 3:
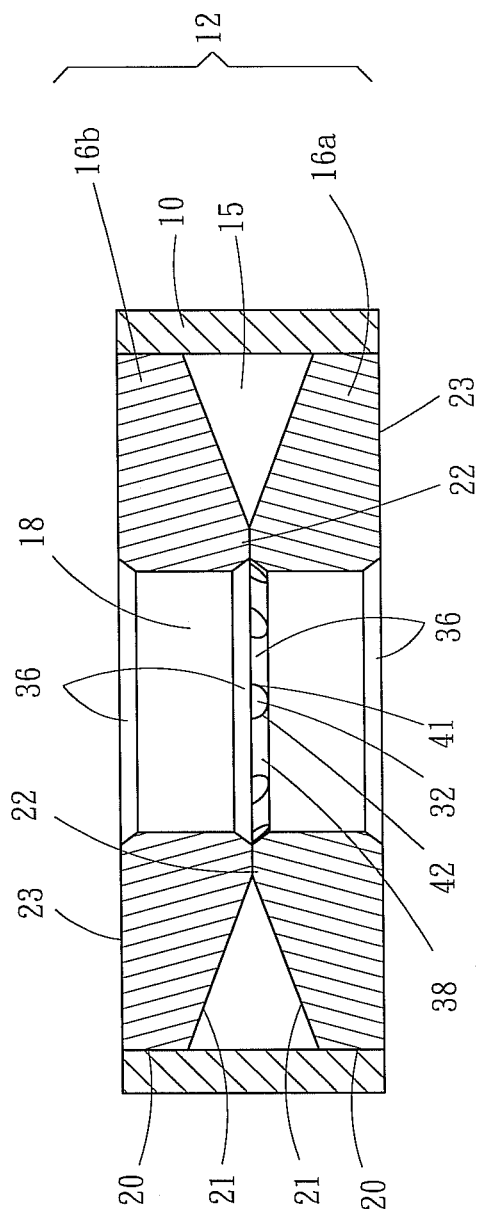
FIG. 3 is a sectional view of the first embodiment of the invention.

FIGS. 1 through 3 illustrate a first embodiment of the invention in perspective, exploded and sectional views. The hybrid lubricating module includes a housing 10 and an assembly 12.

The housing 10 is a hollow tube with an axial cavity 11 to encase the assembly 12 inside to form a sturdy structure in entirety, and is made from a dense solid or porous material.

The assembly 12 also is made from a dense solid or porous material, and includes a first element 16a and a second element 16b coupled together axially. Both the first element 16a and second element 16b respectively an axle hole 25 defined axially. These two axle holes 25 form an axial hole 18 of the assembly 12 for the insertion of a shaft to be supported by the hybrid lubricating module. The elements 16a and 16b have respectively at one end with a circumferential outer wall surface of a greater diameter to form a mounting portion 20, and a waist portion 21 extended from the mounting portion 20 towards the axle hole 25 at the other end. On the waist portion 21 any radial outer circumferential surface in the axial direction is smaller than the mounting portion 20. The waist portion 21 has a distal end to form respectively a connection portion 22 of the elements 16a and 16b. The elements 16a and 16b also have respectively an end surface close to the mounting portion 20 to form the other connection portion 23 opposite to the connection portion 22. In practice, the outer circumferential surface of the waist portion 21 can be formed in different shapes; in various embodiments depicted herein only a typical conical surface is used to facilitate discussion.

In this embodiment differentiation between the first element 16a and second element 16b mainly relies on the connection portion 22 of the first element 16a having one set of multiple notches 35 formed annularly on a free end communicating with the waist portion 21 and axle hole 25, while no notch 35 is formed on the second element 16b. When the connection portions 22 of the first and second elements 16a and 16b are in contact and connected with each other, the notches 35 on the first element 16a and the free end of the other connection portion 22 of the second element 16b form one set of multiple passages 32 to allow lubricating media to seep and flow to the axial hole 18 to lubricate the shaft. The passages 32 have an equivalent hydraulic diameter same as the notches 35. The mounting portion 20 also is formed at a shape and dimension mating the cavity 11 so that the mounting portion 20 can form a tight contact with the inner wall surface of the cavity 11 to allow the assembly 12 to be securely held in the cavity 11 of the housing 10. The outer wall surface of the assembly 12 and inner wall surface of the cavity 11 form a cross section of an isosceles triangle between them to become a storage chamber 15 to store the lubricating media. The passages 32 communicate with the storage chamber 15 and axial hole 18. Thus forms the hybrid lubricating module of this embodiment. The lubricating media generally means lubricating oil, or grease or hybrid lubrication agent containing solid lubricating grains that have a higher viscosity than the lubricating oil.

On the assembly 12 of the invention, the elements 16a and 16b have a portion of the circumferential outer wall surface served as the mounting portion 20, so that during assembly of the elements 16a and 16b in the cavity 11 the axial hole 18 formed by the axle holes 25 is precise coaxially to facilitate control and improve quality in mass production.

The axial cross section of the storage chamber 15 is formed in a shape via the profile of the waist portion 21 of the elements 16a and 16b, and can be formed in various shapes, such as rectangular, arched shapes, polygons and the like. The profile of the storage chamber 15 shown in this embodiment merely serves for illustrative purpose and is not the limitation of the invention.

The shape, number and size of the notches 35 can be adjusted as desired to allow the lubricating media in the storage chamber 15 to flow steadily between the inner wall surface of the axial hole 18 and outer wall surface of the shaft in response to different tribology conditions, thus can greatly extend and improve operation limit and lifespan of the hybrid lubricating module.

When the shaft spins in the axial hole 18 of the assembly 12 the lubricating media in the storage chamber 15 is expanded due to receiving heat generated by tribology. As a result, the viscosity of the lubricating media reduces and fluidity increases. Hence the lubricating media can flow via the passages 32 into the axial hole 18. In addition, during spinning of the shaft, a centrifugal force is generated to reduce the pressure of the passages 32 towards the axial hole 18, while the pressure towards the storage chamber 15 is higher. The pressure difference at two ends of the passages 32 can further push the lubricating media from the storage chamber 15 to the axial hole 18. Therefore, the lubricating interface between the axial hole 18 and shaft is always thicker than the conventional self-lubricating bearings that are pre-infiltrated with lubricating oil of a lower viscosity. Moreover, because of the elements 16a and 16b of the invention can be made of the porous material infiltrated with lubricating oil, aside from the aforesaid lubricating mechanism between the axial hole 18 and shaft to provide the lubricating media through the storage chamber 15 and passages 32, the lubricating oil contained in the porous material also can be supplied through capillary forces to further improve lubricating interface and enhance tribology effect.

The elements 16a and 16b also have two end surfaces around the axle hole 25 to form respectively a groove 36 with an enlarged opening on a wall surface of the axle hole directing towards the connection portions 22 and 23. On the first element 16a with the notches 35 formed on the connection portion 22, the groove 36 communicates with notch openings 41 of the notches 35 formed on the wall surface of the axle hole 25. As the two elements 16a and 16b are connected axially via the adjacent connection portions 22 with the mounting portion 20 encased tightly in the cavity 11 of the housing 10, the two adjacent grooves 36 thereof are joined to form a circular and band type annular groove 38 to communicate with a plurality of passage ports 42 formed by the passages 32 on the wall surface of the axial hole 18. Moreover, the annular groove 38 is formed with a gradually shrunken cross section in the axial direction towards he passage ports 42.

When the shaft is spinning in the axial hole 18, it squeezes and converges the lubricating media in annular groove 38 supplied by a passage 32 approaching the shaft to form a dynamic pressure to support the shaft, and immediately pushes the lubricating media via another adjacent passage 32 into the storage chamber 15, and the shaft spins in the annular groove 38 to approach the next passage 32 to get supply of the lubricating media therefrom, and also squeezes and converges the lubricating media supplied by the approaching passage 32 to form another dynamic pressure to support the shaft; then the lubricating media is pushed into the storage chamber 15 again via yet another adjacent passage 32; thus with the shaft spinning cyclically in the annular groove 38 to squeeze and converge the lubricating media supplied by the approaching passage 32, a continuous dynamic pressure supporting the shaft is formed, through the gradually shrunk cross section of the annular groove 38 the lubricating media can be recycled and stored in the storage chamber 15 via the adjacent next passage 32. Therefore a multi-channel dynamic-pressure and recyclable lubricating media mechanism is formed to provide strong support for the spinning shaft. Because the hybrid lubricating module of the invention provides automatic replenishment and recycling of the lubricating media, and a novel lubricating mechanism with dynamic pressure is formed to provide strong and continuous support for the shaft; therefore, enhance loading capacity and anti-vibration capability, and prolong the lifespan.

To facilitate discussion, this embodiment and all other embodiments below have the assembly 12 with the groove 36 formed on the surface of two ends of the axle hole 25 of each element towards the connection portions 22 and 23 with an increasingly enlarged opening. It's obvious, to achieve the effect of supplying the dynamic pressure and automatically replenishing and recycling the lubricating media to provide strong support for the shaft, at least one element of the assembly 12 should have one groove 36 towards the two connection portions 22 and 23 with an enlarged opening formed on the surface of the axle hole 25, and the groove 36 has to communicate with the notch openings 41 on the surface of the axle hole 25 corresponding to the notches 35, so that at least one groove 36 of the adjacent elements surrounds to form the annular groove 38 to communicate with the passage ports 42 formed on the wall surface of the axial hole 18 corresponding to the passages 32; then the effect similar to the annular groove 38 discussed previously can be accomplished.

Figure 4:
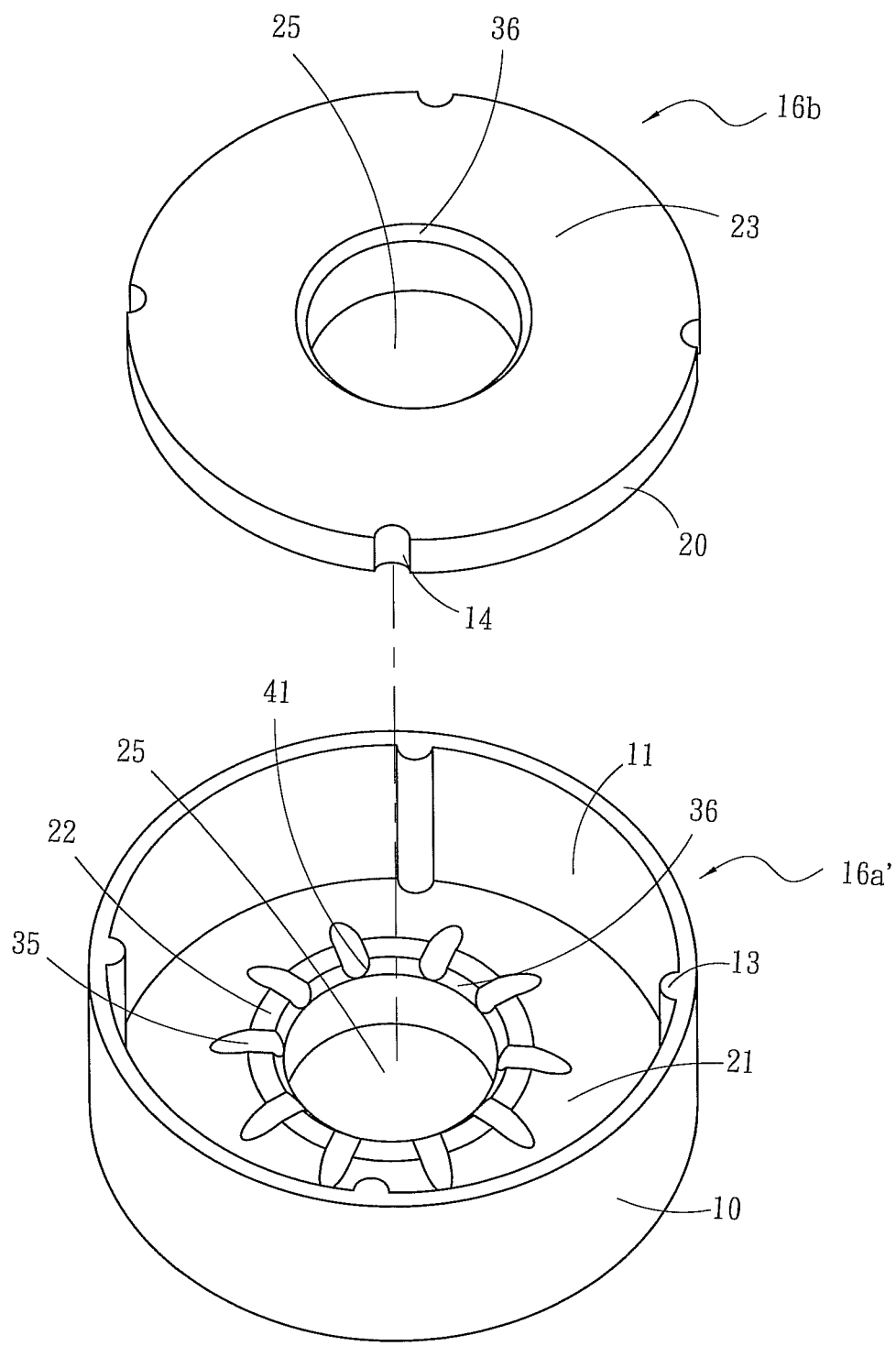
FIG. 4 is another exploded view of the first embodiment of the invention.

Please refer to FIG. 4 for another exploded view of the first embodiment. It differs from FIGS. 1 through 3 by having the mounting portion 20 of the first element 16a and inner wall surface at one end of the housing 10 formed integrally as a monolithic piece 16a'; then the connection portion 22 thereof is coupled with the other connection portion 22 of the second element 16b to simplify mass production process and enhance the strength of total structure. In addition, the housing 10 has four symmetrical ribs 13 formed axially on the inner wall surface, and the mounting portion 20 of the second element 16b has locating notches 14 formed on the outer circumferential surface mating the ribs 13 to latch with each other to further improve mass production process and structural strength of the hybrid lubricating module.

Figure 5:
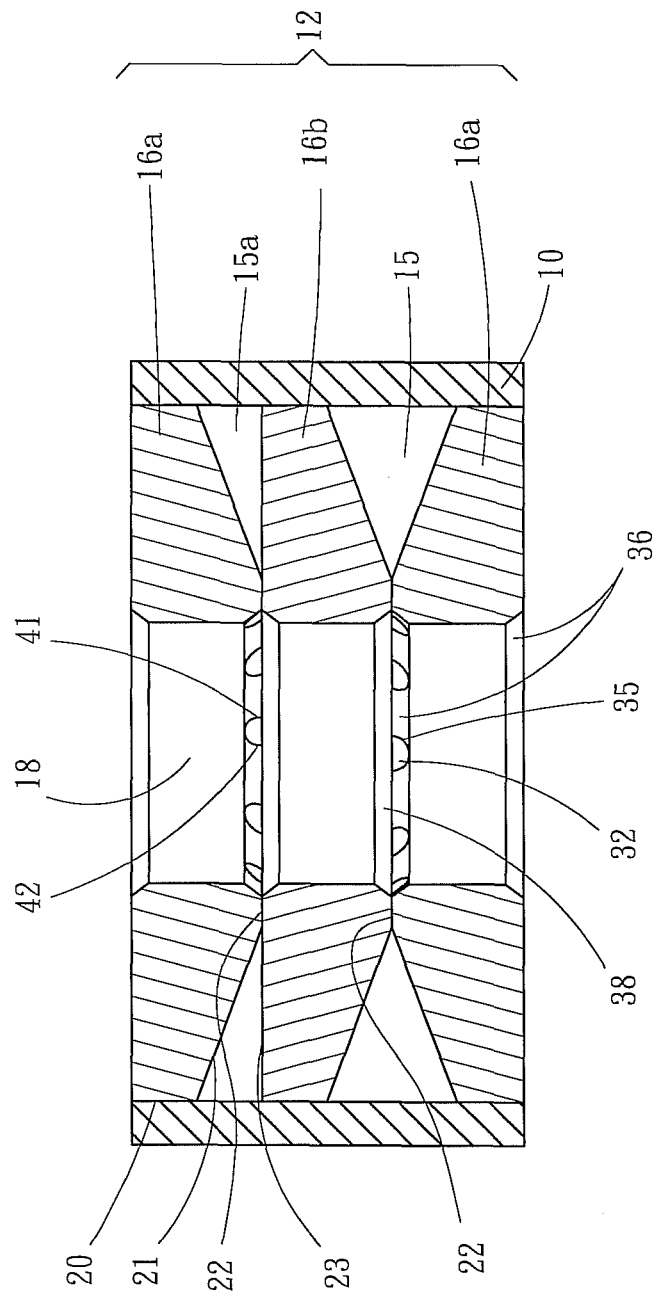
FIG. 5 is a sectional view of a second embodiment of the invention.

Please refer to FIG. 5 for a second embodiment of the invention. The assembly 12 includes three elements of two types 16a and 16b same as the first embodiment and arranged in a different manner inside the cavity 11 of the housing 10. In terms of the performance of the hybrid lubricating module, with the length of the first and second elements 16a and 16b same as the first embodiment, the second embodiment provides the shaft with a longer loading length. If maintaining the same loading length for the shaft as the first embodiment is intended, the length of the elements 16a and 16b used in the second embodiment could be shorter.

Two sets of adjacent elements 16a, 16b and 16b, 16a are held in the cavity 11 of the assembly 12 that can be arranged in the same direction and connected in series, or reversely abutted against each other. When two adjacent elements 16a and 16b (particularly, the lower element 16a and the middle element 16b) are reversely abutted against each other, their connection portions 22 are connected same as the first embodiment. When two adjacent elements 16a and 16b (particularly, the upper element 16a and the middle element 16b) are arranged in the same direction and connected in series, the connection portion 22 of the first element 16a is abutted against the connection portion 23 of the second element 16b. Compared with the first embodiment, this embodiment allows one set of multiple notches 35 on the connection portion 22 of the first element 16a and the other connection portion 23 to surround and jointly form another set of passages 32 at the same number and same equivalent hydraulic diameter as the notches 35 of the first embodiment. Moreover, the waist portion 21 of the first element 16a and the other connection portion 23 of the second element 16b and the inner wall surface of the housing 10 form a cross section of a right-angled triangle to become another storage chamber 15a at a capacity one half of the storage chamber 15 as previously discussed. The two sets of adjacent grooves 36 on the two junctions of the assembly 12 form two sets of band type annular groove 38 with gradually shrunk cross sections that provide same function as that of the first embodiment does. Hence the two storage chambers 15 and 15a can respectively communicate with the corresponding set of multiple passages 32 to automatically replenish and recycle the lubricating media of varying viscosities and to continuously generate dynamic pressure by the two sets of passages 32.

Figure 6:
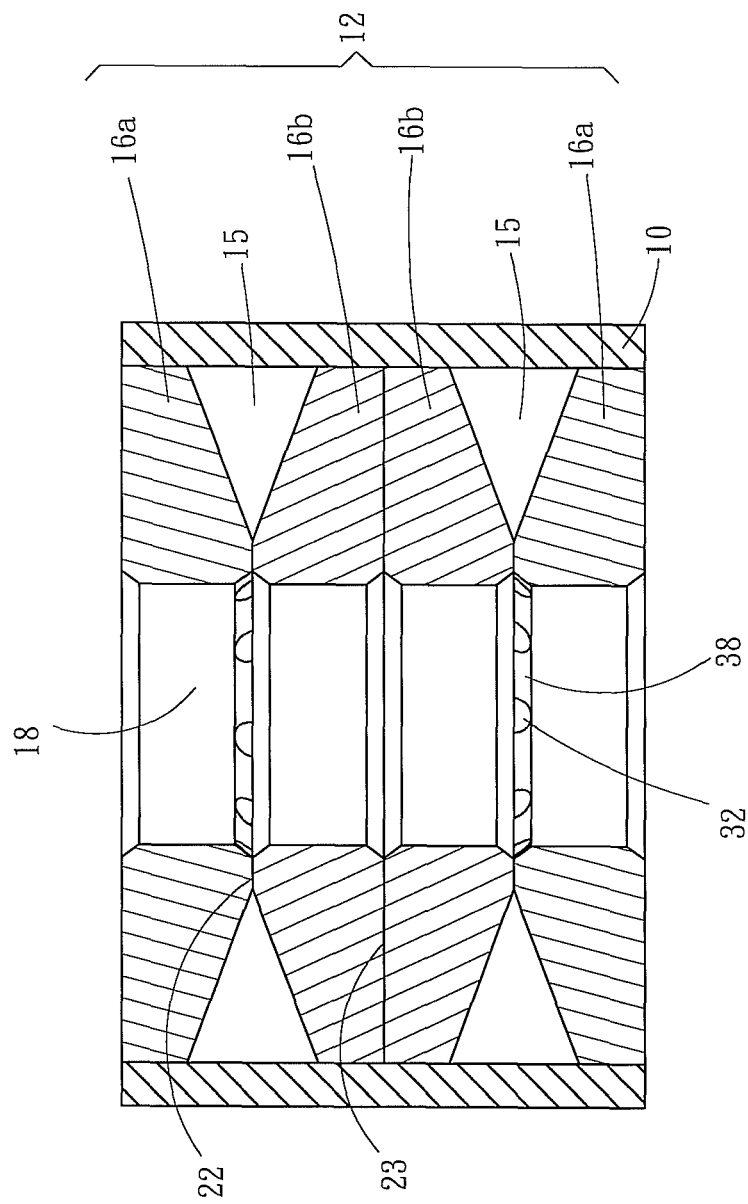
FIG. 6 is a sectional view of a third embodiment of the invention.

Please refer to FIG. 6 for a third embodiment of the invention. It includes four elements of two types 16a and 16b same as that of the first embodiment, but are arranged in a different manner in the cavity 11 of the housing 10. The assembly 12 can be seen as two sets of adjacent first elements 16a and second elements 16b same as that of the first embodiment coupled and connected to each other via the connection portions 22, with the two adjacent second elements 16b of the two sets of elements in contact with each other via the other connection portions 23. The assembly 12 and inner wall surface of the housing 10 form two storage chambers 15 that further form two sets of multiple passages 32 between the two sets of adjacent elements 16a and 16b to communicate with the axial hole 18. Given the same length of the first and second elements 16a and 16b as the first embodiment does, this embodiment provides even more loading length for the shaft than the second embodiment. On the other hand, adopted for the loading length of the shaft same as the first embodiment does, the four elements 16a and 16b have respectively a smaller length. In such an occasion, two sets of passages 32 are located at a shorter distance to supply the lubricating media to the axial hole 18, thus the lubricating media can be distributed axially to form a tribology interface with a more uniform thickness.

In practice, the assembly 12 consisting of the first elements 16a and second elements 16b of a same series can be formed in varying combinations with different numbers thereof. Through different arrangements of adjacent elements 16a and 16b, the storage chambers 15 and 15a formed with the housing 10 can also vary in number and types, and the number and types of the passages 32 bridging the storage chambers 15 and 15a and the axial hole 18 also are different. Thus, not only the storage chambers 15 and 15a can store the lubricating media of varying types and capacities, a more uniform lubricating interface can be formed through the multiple passages 32 distributed on the axial hole 18. Through the multiple sets of gradually shrunk annular grooves 38 communicate respectively with the multiple sets of passages 32, a multi-channel dynamic-pressure and recyclable lubricating media mechanism can be formed to support the spinning shaft. Thus operation limit and lifespan of the hybrid lubricating module can be greatly enhanced, and a flexible design and versatile hybrid lubricating module development platform also can be established.

Figure 7:
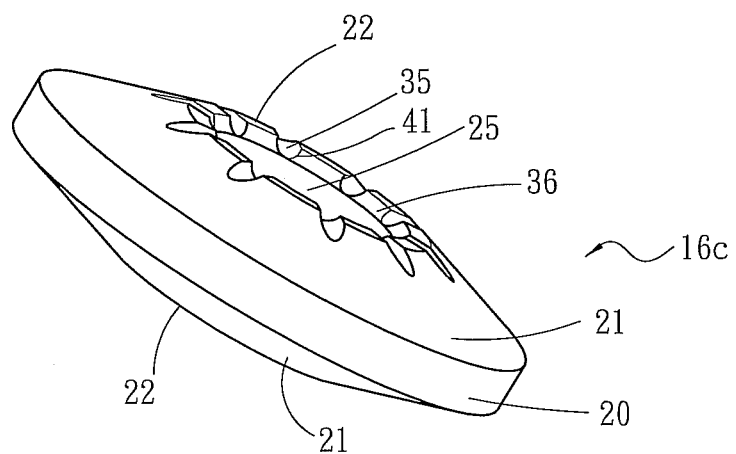
FIG. 7 is a perspective view of one type of element of the invention.
Figure 8:
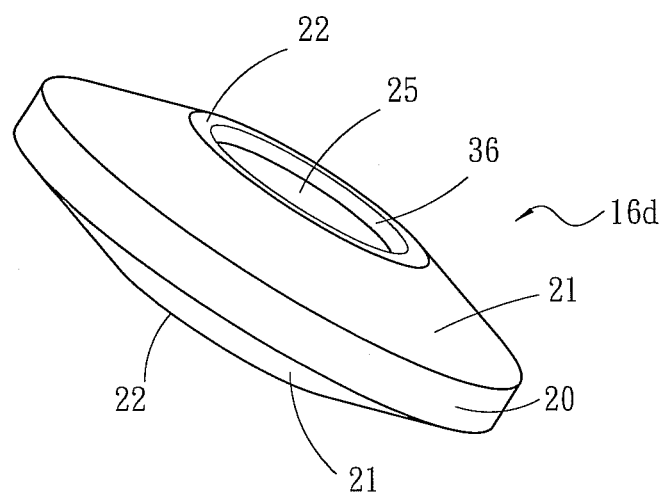
FIG. 8 is a perspective view of another type of element of the invention.
Figure 9:
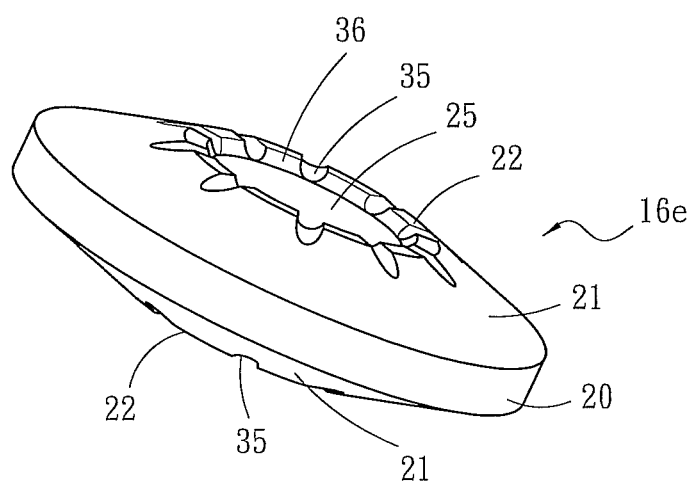
FIG. 9 is a perspective view of yet another type of element of the invention.

Please refer to FIGS. 7 through 9 for another embodiment of the elements 16c, 16d and 16e that represent a second series and are formed respectively in a button shape. They can be seen as the derivatives of the first series previously discussed with the connection portions 23 of adjacent elements 16a and 16b connected with each other in various fashions. Each of the elements 16c, 16d and 16e has a mounting portion 20 formed with a greater radial circumferential outer wall surface axially from the center, and two waist portions 21 extended from the edges of mounting portion 20 to the axle hole 25 at two ends thereof. The waist portion 21 has a smaller axially circumferential outer wall surface at any radial distance than the mounting portion 20. The two waist portions 21 have respectively a distal end formed two connection portions 22 of the elements 16c, 16d and 16e.

The three elements 16c, 16d and 16e differ from each other as follows. On element 16c, at a free end of one of the two connection portions 22 has one set of multiple notches 35 formed annularly communicating with the waist portion 21 and axle hole 25; On element 16e, at the free ends of the two connection portions 22 have two sets of multiple notches 35 formed annularly communicating with the waist portions 21 and the axle hole 25; and on element 16d, no notch 35 is formed on the two connection portions 22 thereof. The elements 16c, 16d and 16e further have respectively two end surfaces around the axle hole 25 with a groove 36 formed thereon with a gradually enlarged opening on the end surface towards the two connection portions 22. On the element 16c, one of the two grooves 36 communicates with the multiple notch openings 41 formed on the wall surface of the axle hole 25 corresponding to the one set of notches 35. On the another element 16e, the two grooves 36 communicate with the multiple notch openings 41 formed on the wall surface of the axle hole 25 corresponding to the two sets of notches 35.

To facilitate discussion, the elements 16c, 16d and 16e adopt the waist portion 21 and notches 35 same as that of the elements 16a and 16b previously discussed. The waist portion 21 discussed in the following embodiments is shown with two conical surfaces symmetrical axially.

In practice, the size and shape of the elements 16c, 16d and 16e can be changed and still achieve similar effect.

Figure 10:
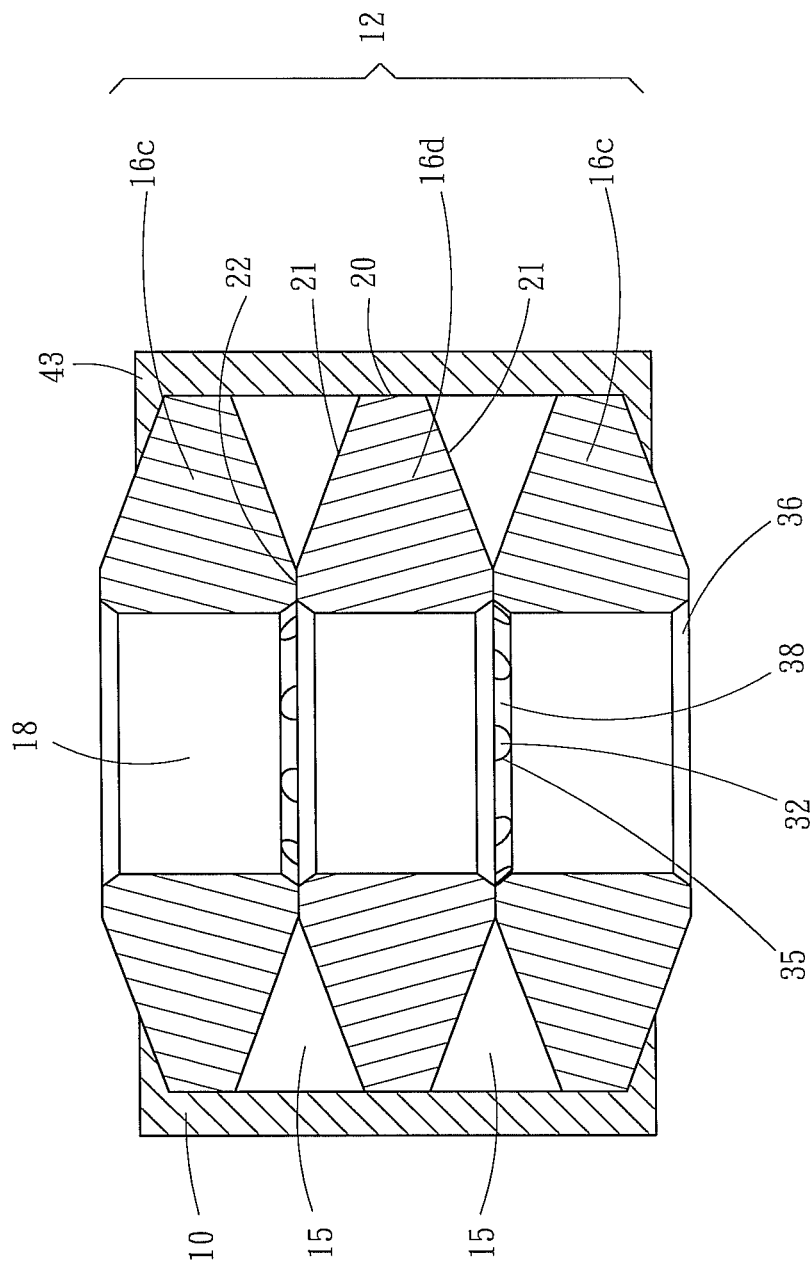
FIG. 10 is a sectional view of a fourth embodiment of the invention.

FIG. 10 illustrates the cross section of a fourth embodiment of the invention. The assembly 12 includes three elements of two types 16c and 16d arranged to form two sets of adjacent elements 16c, 16d, and 16d, 16c, with the mounting portions 20 tightly encased in the cavity 11 of the housing 10 to form a hybrid lubricating module. The assembly 12 has two elements 16c at two ends, each has a connection portion 22 with one set of multiple notches 35 formed thereon connected to the connection portion 22 of an adjacent element 16d in the middle to form two sets of multiple passages 32 to allow the lubricating media to seep and flow into the axial hole 18 to lubricate the spinning shaft. The outer wall surface of the waist portions 21 of the elements 16c and 16d and the inner wall surface of the housing 10 are surrounded to form two storage chambers 15 with the cross section of isosceles triangles to store the lubricating media, and two sets of passages 32 are formed in communicating with the storage chambers 15 and axial hole 18. When the shaft spins in the axial hole 18, through the two sets of annular grooves 38 formed by two sets of adjacent grooves 36, a multi-channel dynamic-pressure and recyclable lubricating media mechanism can be generated to provide strong support for the shaft. Compared with the second embodiment, the loading length of the shaft and lubricating media supply capacity are doubled.

Figure 11:
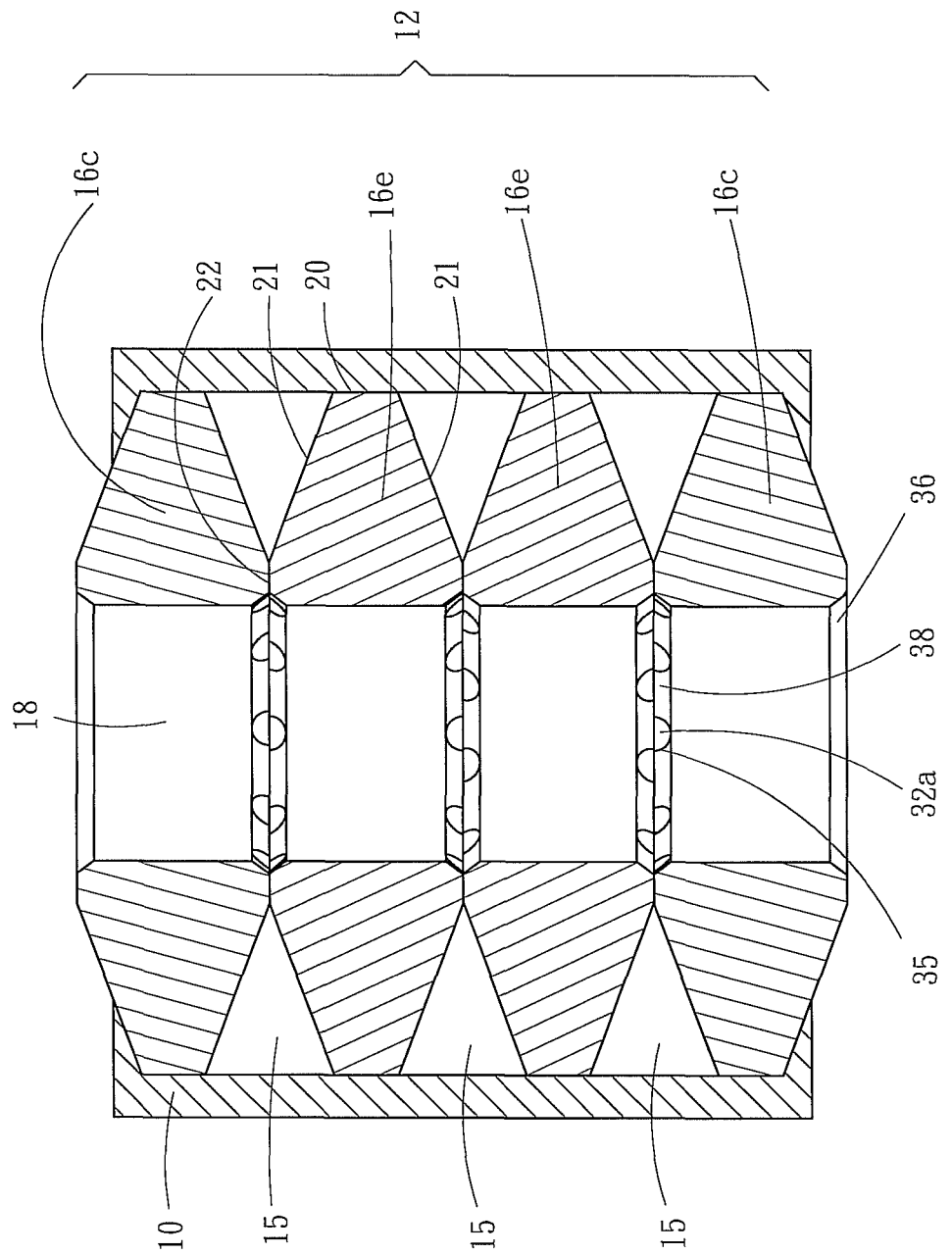
FIG. 11 is a sectional view of a fifth embodiment of the invention.

FIG. 11 illustrates a fifth embodiment of the invention. The assembly 12 consists of four elements of two types 16c and 16e of the second series that are arranged in three sets of adjacent elements 16c and 16e, 16e and 16e, and 16e and 16c, and are tightly encased in the cavity 11 of the housing 10 to form a hybrid lubricating module. It has three sets of adjacent multiple notches 35 to form three sets of multiple passages 32a, each has an equivalent hydraulic diameter twice of the passages 32 previously discussed. The outer wall surfaces of the waist portion 21 of the four elements 16c and 16e and the inner wall surface of the cavity 11 form three storage chambers 15 in cross sections of isosceles triangle. The three sets of passages 32a communicate with the storage chambers 15 and axial hole 18. When the shaft spins in the axial hole 18, through the three sets of annular grooves 38 formed by three sets of adjacent grooves 36, a multi-channel dynamic-pressure and recyclable lubricating media mechanism are generated to provide strong support for the shaft. A uniform tribology interface also can be formed.

In this embodiment, the multiple notches 35 formed on the elements 16c and 16e do not have to be in the same number and spaced precisely with that of the adjacent elements 16c and 16e for alignment and coupling with each other. Two sets of adjacent notches 35 can be positioned randomly to form one set of staggered passages 32a, which is twice the number of the notches 35 of each set. The staggered passages 32a can be replaced with another set of aligned passages 32a formed by the notches 35 fabricated through aligned positioning. The staggered passages 32a and the aligned passages 32a have same equivalent hydraulic diameter, hence the adjacent elements 16a and 16e in the assembly 12 can be arranged randomly so that each set of adjacent elements 16c and 16e have two sets of notches 35 arranged in a staggered manner to form one set of staggered passages 32a. As a result, fabrication process for mass production is greatly simplified, and the lubricating media can be evenly distributed and the cost also can be reduced.

In the fourth and fifth embodiments discussed previously, the assembly 12 is installed in the housing 10 with the mounting portion 20 of each element 16c, 16d and 16e being press-fitted into the housing 10 tightly in the cavity 11 and riveted axially. During the riveting process, two ends of the housing 10 are extended and compressed towards two end surfaces of the assembly 12 to form a reinforced rib 43 to seal the housing 10 and assembly 12. Such an installation approach can also be adopted on other embodiments of the invention to further improve the structural strength of the hybrid lubricating module and seal the storage chambers, and also make the entire profile more appealing.

Thus, the invention provides a structure capable of responding to different loading lengths of the shaft, and the number and capacity of the storage chamber can be expanded, and the type and injecting positions of the lubricating media also can be adjusted. Fabrication process for mass production also can be simplified to reduce production cost. Improved total structural strength and enhanced thermal conductivity of the tribology interface can be achieved. Moreover, strong dynamic pressure can be generated continuously, and the lubricating media can be recycled. Thus the hybrid lubricating module can meet application requirements of diversified industries.

Figure 12:
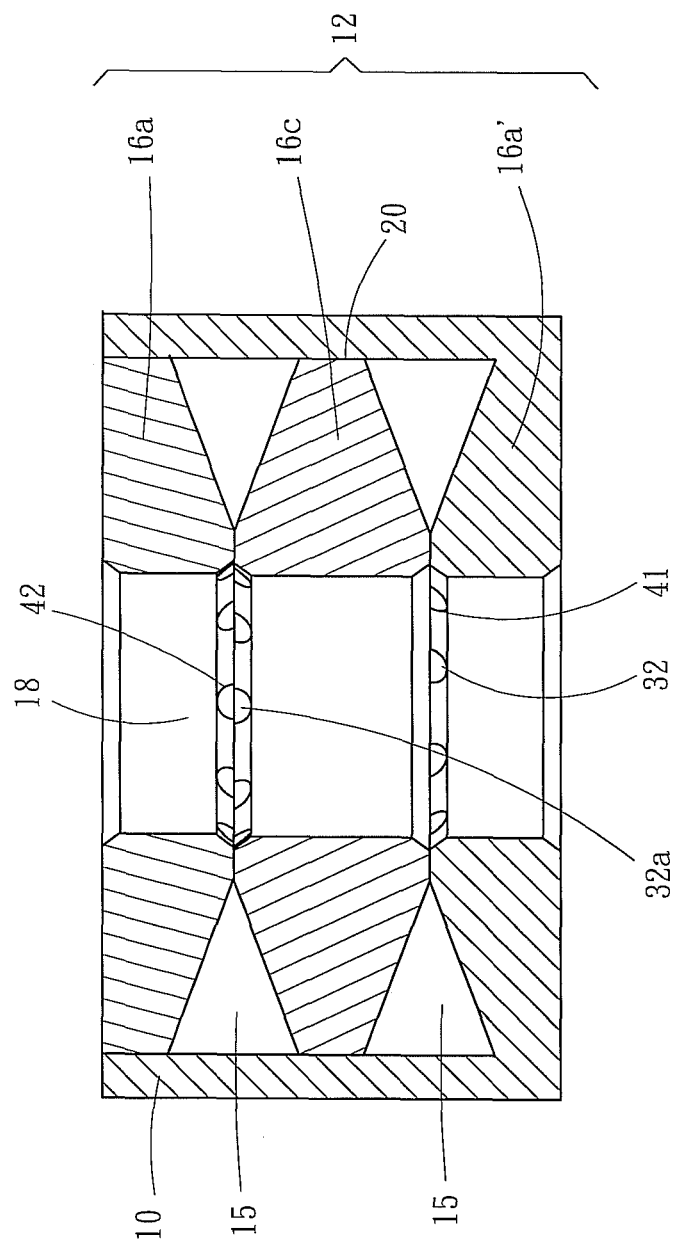
FIG. 12 is a sectional view of a sixth embodiment of the invention.

FIG. 12 illustrates a sixth embodiment of the invention. The assembly 12 consists of two elements 16a of the first series and one element 16c of the second series that are arranged in two sets of adjacent elements 16a, 16c, and 16c, 16a, and have the mounting portions 20 tightly encased by the inner wall surface of the housing 10 to form a hybrid lubricating module. Similar to the element 16a' as depicted in FIG. 4, another element 16a'' of the assembly 12 has the mounting portion 20 of the element 16a and the inner wall surface at one end of the housing 10 integrally formed as a monolithic piece. Other elements 16a and 16c of the assembly 12 are coupled as previously discussed. Such a design can further simplify fabrication for mass production and form an even stronger total structure.

The hybrid lubricating module of the aforesaid embodiment has a shaft loading length greater than that of the second embodiment with three elements, but shorter than the fourth embodiment which also consists of three elements. It also has two storage chambers 15 formed in a shape same as that of the fourth embodiment, and one set of multiple passages 32 and another set of multiple passages 32a with an equivalent hydraulic diameter twice the passages 32.

Figure 13:
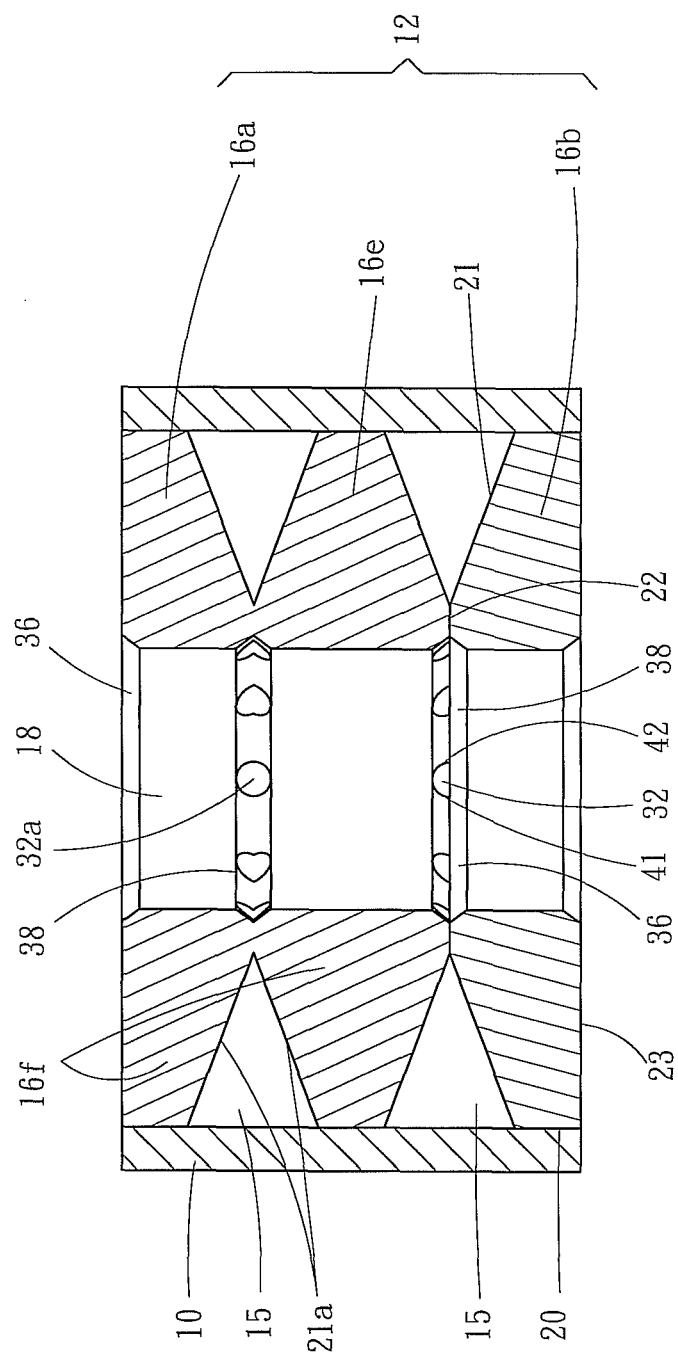
FIG. 13 is a sectional view of a seventh embodiment of the invention.

FIG. 13 illustrates a seventh embodiment of the invention. The assembly 12 consists of two elements 16a, 16b of the first series and one element 16e of the second series to form two sets of adjacent elements 16a, 16e and 16e, 16b and have the mounting portions 20 tightly encased by the inner wall surface of the housing 10 to form a hybrid lubricating module. The element 16a of the assembly 12 is coupled with the adjacent element 16e in an integrated manner during fabrication to become another element 16f which can be formed by die casting, injection, punching or other techniques known in the art. It includes two waist portions 21 to form a waist portion 21a with a triangular cross section and a set of passages 32a between the waist portions 21. On the free end of element 16f towards the adjacent element 16b also has one set of multiple notches 35 and a waist portion 21 formed on the connection portion 22. The hybrid lubricating module thus formed also can simplify fabrication process for mass production and improve the total structural strength.

The assembly 12 previously discussed includes the element 16f formed integrally with one set of multiple notches 35 incorporating with the connection portion 22 of an adjacent element 16b to form another set of multiple passages 32. The outer wall surfaces of the waist portions 21 and 21a of the two elements 16b and 16f and the inner wall surface of the housing 10 jointly form two storage chambers 15 with the cross section of an isosceles triangle. The two sets of passages 32 and 32a communicate with the two storage chambers 15 and axial hole 18. When the shaft spins in the axial hole 18, through two sets of annular grooves 38 formed by two sets of adjacent grooves 36, a continuous multi-channel dynamic-pressure and recyclable lubricating media mechanism are formed to provide strong support for the shaft, and an evenly distributed lubricating interface also is formed. This embodiment provides the shaft loading length same as that of the sixth embodiment, but shorter than the fourth embodiment, however with same two storage chambers 15 as the fourth embodiment does.

In various embodiments of the invention, at least one adjacent element is installed randomly in the radial direction so that the groove thereof communicates with two sets of adjacent notches that are arranged in a staggered manner to form one set of staggered passages communicating with the annular groove. All this aims to facilitate discussion of the features of the invention. In practice, a heavy duty bearing could have the shaft spinning at a speed more than tens of thousand RPM to pass swiftly through the passages on the axial hole. Of course, at least one set of adjacent elements can also be installed with definitive radial positioning so that the groove can communicate and aligned with two sets of adjacent notches to form one set of multiple aligned passages communicating with the annular groove. The staggered and aligned passages have a same equivalent hydraulic diameter. Hence same function and effect can be accomplished in various embodiments set forth above without being constrained by fabrication complexity and precise positioning.

On the assembly of the invention, the outer wall surface of the mounting portion of each element may also have at least one axial rib formed thereon, and the inner wall surface of the cavity of the housing also has at least one locating notch corresponding to the rib to latch with each other to form precise positioning and enhance structural strength.

In order to further simplify fabrication process for mass production and enhance structural strength, in the assembly of the invention at least one element can be integrally formed with the inner wall of the housing via the mounting portion. Similarly, at least one set of adjacent elements can be integrally formed by joining the connection portions, then are coupled with other elements of the assembly as depicted in the various embodiments previously discussed.

In the aforesaid embodiments forming of the multiple passages can be made according to the rule below:

$$-2 \leq \log D \leq 0.5 \times \log(2 \times Sd \times H/N)$$

Where N is total number of the passages in the hybrid lubricating module, D is the equivalent hydraulic diameter of each passages by the unit of millimeter (mm), Sd is the diameter of the shaft by mm, and H is the length of the axial hole by mm.

In the aforesaid various embodiments, the elements in the same series adopt the same dimension and shape to facilitate discussion. In practice there is no limitation on the size, shape, number and arrangement fashion of the elements, nor shall they limit the scope of the invention.

As a conclusion, the invention provides many advantages, notably:

Provides a novel hybrid lubricating module consisting of at least two elements. At least one of the elements has at least one free end with one set of multiple notches communicating with the axle hole; and at least one set of adjacent elements have the multiple notches and the housing and assembly jointly formed at least one set of multiple passages to transport lubricating media, and at least one storage chamber is formed therewith to store the lubricating media. Therefore the loading length, and number and capacity of the storage chamber are adjustable, and an evenly distributed lubricating interface can be formed.

1. Provides a hybrid lubricating mole passages formed via varying arrangements in the adjacent elements, a continuous, uniform and stable lubricating interface is formed between the shaft and axial hole to improve lubrication, therefore can extend and improve operation limit and prolong lifespan of the hybrid lubricating module.

2. Provides a hybrid lubricating module product platform with a modular design and simplified fabrication process. Mold design is simpler and the number of the molds required is fewer for mass production. During assembly of the elements in the housing no complicated and precise positioning is needed for alignment of the multiple passages on the adjacent elements. Hence mass production process is simpler, and control and improvement of product quality are easier, and the cost can be greatly reduced.

3. Provides a novel lubricating mechanism with strong support for the spinning shaft. Through the shaft spinning in the annular groove to squeeze and converge the lubricating media supplied by a passage approaching the shaft, and a dynamic pressure to support the shaft is generated, then the lubricating media are recycled and stored through a next passage to the storage chamber to form a recycle lubrication mechanism. Therefore the dynamic pressure can be generated continuously and the lubricating media can be recycled and recovered.

4. a hybrid lubricating module development platform with a flexible design and versatile applications. By adjusting various parameters, such as the shape, number, size and arrangement of the elements, and the shape, forming method, location, number and size of the passages, the shape and number of the grooves, the number and capacity of the storage chamber, and the type and injecting location of the lubricating media, different types of hybrid lubricating module can be developed and made in response to varying lubrication conditions and requirements of diversified industries.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hybrid lubricating module, comprising:
a housing which is a hollow tube with an axial cavity inside; and
an assembly including at least two elements, each element including two opposite ends, each end forming a connection portion, the at least two elements including at least one set of two adjacent elements being axially coupled together with one of the two adjacent elements abutting against another one of the two adjacent elements to allow at least one set of two abutting connection portions of the at least one set of the two adjacent elements to be closely contacted therebetween to form the assembly, and a largest circumferential outer wall surface between two connection portions of each element forming a mounting portion to allow the assembly to be fixedly encased in and fully contacted with the cavity of the housing to form the hybrid lubricating module, each element also including at least one waist portion defined between the two connection portions of each element, any circumferential outer wall surface of the at least one waist portion having smaller radial dimension than the largest circumferential outer wall surface of the mounting portion, such that at least one storage chamber of the hybrid lubricating module being cooperatively formed between a circumferential outer wall surface of the assembly and a circumferential inner wall surface of the housing to store lubricating media therein, each element further containing an axle hole axially running through the two opposite ends thereof, axle holes of the at least two elements forming an axial hole of the assembly for insertion of a spinning shaft to be supported and lubricated by the hybrid lubricating module;
wherein the at least one waist portion is axially concaved from the mounting portion towards at least one of the two connection portions, at least one set of multiple notches being defined between the at least one set of the two adjacent elements of the assembly and annularly formed on at least one of the two abutting connection portions and communicated with the at least one waist portion and the axle hole, the at least one set of multiple notches forming at least one set of multiple passages of the assembly to communicate with the at least one storage chamber and the axial hole.

2. The hybrid lubricating module of claim 1, wherein the mounting portion is located close to one of the two connection portions of each element and axially concaved towards another connection portion to form a waist portion of each element.

3. The hybrid lubricating module of claim 1, wherein the mounting portion is located in the middle of the two connection portions of each element and axially concaved towards the two connection portions to form two waist portions of each element.

4. The hybrid lubricating module of claim 1, wherein the mounting portion is formed in a shape and dimension mating the circumferential inner wall surface of the housing such that the at least two elements can be securely encased in the housing.

5. The hybrid lubricating module of claim 1, wherein the housing includes at least one rib axially extended on the circumferential inner wall surface and the mounting portion includes at least one locating notch on the largest circumferential outer wall surface corresponding to the at least one rib to latch each other.

6. The hybrid lubricating module of claim 1, wherein the mounting portion includes at least one rib axially extended on the largest circumferential outer wall surface and the housing includes at least one locating notch on the circumferential inner wall surface corresponding to the at least one rib to latch each other.

7. The hybrid lubricating module of claim 1, wherein each element includes at least one groove with an enlarged opening on at least one end of wall surface of the axle hole directing towards the at least one of the two connection portions.

8. The hybrid lubricating module of claim 7, wherein the at least one groove communicates with at least one set of multiple notch openings corresponding to the at least one set of multiple notches on the wall surface of the axle hole.

9. The hybrid lubricating module of claim 7, wherein the at least two elements of the assembly are axially coupled with each other to allow the at least one groove of each element to form at least one annular groove of the assembly which communicates with at least one set of multiple passage ports corresponding to the at least one set of multiple passages on a wall surface of the axial hole.

10. The hybrid lubricating module of claim 9, wherein the at least one set of the two adjacent elements of the assembly is installed randomly such that at least one pair of the at least one set of multiple notches respectively communicate with the at least one groove and are arranged in a staggered manner to form at least one set of staggered multiple passages communicating with the at least one annular groove.

11. The hybrid lubricating module of claim 9, wherein the at least one set of the two adjacent elements of the assembly is installed according to a selected position such that at least one pair of the at least one set of multiple notches respectively communicate with the at least one groove and are arranged in an aligned manner to form at least one set of aligned multiple passages communicating with the at least one annular groove.

12. The hybrid lubricating module of claim 1, wherein the housing and the assembly are assembled by riveting axially and tightly the mounting portions of the at least two elements of the assembly in the cavity such that two ends of the housing are extended and compressed towards two ends of the assembly to form a reinforced rib to encase the housing and the assembly.

13. The hybrid lubricating module of claim 1, wherein at least one element of the assembly and the housing are integrally formed as a monolithic piece.

14. The hybrid lubricating module of claim 1, wherein at least two adjacent elements of the assembly are integrally formed as a monolithic piece.

15. The hybrid lubricating module of claim 1, wherein the at least one set of multiple passages is formed according to the following formula:

$$-2 \leq \log D \leq 0.5 \times \log(2 \times Sd \times H/N)$$

where N is total number of the at least one set of multiple passages in the hybrid lubricating module, D is an equivalent hydraulic diameter of each passage by a unit of millimeter (mm), Sd is a diameter of the shaft by mm, and H is a length of the axial hole by mm.

* * * * *